(12) United States Patent
Nonaka et al.

(10) Patent No.: US 7,405,762 B2
(45) Date of Patent: Jul. 29, 2008

(54) CAMERA HAVING AF FUNCTION

(75) Inventors: Osamu Nonaka, Sagamihara (JP); Minoru Hara, Hachioji (JP)

(73) Assignee: Olympus Corporation, Tokyo (JP)

( * ) Notice: Subject to any disclaimer, the term of this patent is extended or adjusted under 35 U.S.C. 154(b) by 672 days.

(21) Appl. No.: 10/768,633

(22) Filed: Jan. 30, 2004

(65) Prior Publication Data

US 2004/0183939 A1 Sep. 23, 2004

(30) Foreign Application Priority Data

Feb. 4, 2003 (JP) .............................. 2003-027361

(51) Int. Cl.
G03B 13/00 (2006.01)
G03B 3/00 (2006.01)
G03B 13/18 (2006.01)
G03B 13/32 (2006.01)
G03B 7/099 (2006.01)
G03B 3/10 (2006.01)
G03B 13/34 (2006.01)
H04N 5/232 (2006.01)
G02B 7/04 (2006.01)
G02B 21/00 (2006.01)
G02B 7/28 (2006.01)
G01B 9/04 (2006.01)

(52) U.S. Cl. ................. 348/348; 250/201.7; 250/201.8; 396/96; 396/111; 396/125; 396/133

(58) Field of Classification Search ......... 348/345–357; 396/125–128, 104; 250/201.7, 201.8
See application file for complete search history.

(56) References Cited

U.S. PATENT DOCUMENTS

| | | | | |
|---|---|---|---|---|
| 5,353,089 A * | 10/1994 | Yaji | ........................... | 348/353 |
| 5,597,999 A * | 1/1997 | Kinba et al. | ............. | 250/201.7 |
| 5,652,926 A * | 7/1997 | Saito | ........................... | 396/97 |
| 6,229,568 B1 * | 5/2001 | Kawaguchi et al. | ......... | 348/350 |
| 6,763,187 B2 * | 7/2004 | Shiraishi | ..................... | 396/104 |
| 2001/0028402 A1 | 10/2001 | Sugimoto et al. | | |

FOREIGN PATENT DOCUMENTS

| | | |
|---|---|---|
| JP | 11-023955 | 1/1999 |
| JP | 2001-141985 | 5/2001 |
| JP | 2001-249267 | 9/2001 |

* cited by examiner

*Primary Examiner*—David Ometz
*Assistant Examiner*—Tuan H Le
(74) *Attorney, Agent, or Firm*—Straub and Pokotylo; John C. Pokotylo (57) ABSTRACT

A camera having an electronic image pickup element and a distance-measuring circuit that uses light signals obtained from light images of a plurality of distance-measuring areas set in a photographing screen to select a main subject and measure the distance to the subject. The camera has a focusing component, operating when the position of the main subject cannot be identified by the distance-measuring circuit, to divide the photographing screen into a plurality of areas to identify an area in which the main subject is present on the basis of a luminance distribution obtained from the areas other than those overlapping the distance-measuring areas. The focusing component focuses a photographing lens on the position of the highest contrast signal while scanning the lens position of the photographing lens.

6 Claims, 6 Drawing Sheets

CAMERA HAVING AF FUNCTION

CROSS-REFERENCE TO RELATED APPLICATIONS

This application is based upon and claims the benefit of priority from the prior Japanese Patent Application No. 2003-27361, filed Feb. 4, 2003, the entire contents of which are incorporated herein by reference.

BACKGROUND OF THE INVENTION

1. Field of the Invention

The present invention relates to what is called an auto focus technique for cameras which electronically records a subject image obtained by an image pickup element (imager) via a photographing lens.

2. Description of the Related Art

In general, an auto focus (AF) function of a camera provided with an image pickup element has hitherto been based on an AF system of focusing a photographing lens by varying the focus position of the photographing lens while determining the intensity of a contrast signal for an image obtained by the image pickup element at each focus position, that is, what is called an "imager AF system." The imager AF requires a calculating process to be executed by obtaining image data at a plurality of focus positions immediately before photographing.

Thus, since the auto focusing based on the imager AF includes an operation of scanning the lens position of the photographing lens, a release time lag from depression of a release button till the start of driving of a shutter tends to be long. Techniques for reducing the release time lag have been proposed in Jpn. Pat. Appln. KOKAI Publication No. 2001-141985, Jpn. Pat. Appln. KOKAI Publication No. 2001-249267, and Jpn. Pat. Appln. KOKAI Publication No. 1999-023955; these techniques also use external light AF carried out by a distance-measuring device utilizing an optical system different from the photographing lens.

Another example of the imager AF in which the focus is detected for a plurality of points in a screen has been disclosed in Jpn. Pat. Appln. KOKAI Publication No. 2001-255450.

BRIEF SUMMARY OF THE INVENTION

It is an object of the present invention to provide a camera having an AF function of accurately focusing a photographing lens without depending on the position of a main subject in a screen.

The present invention provides A camera acquiring an image of a main subject using an electronic image pickup element, the camera comprising a photographing lens which guides a luminous flux from the subject to the electronic photographing element; a driving mechanism which drives a focusing lens included in the photographing lens; a distance-measuring circuit based on a phase difference detecting system to detect a focus state for a particular area in a photographing composition; and a CPU that calculates a focus position of the photographing lens on the basis of a detection result from the distance-measuring circuit to drivingly control the driving mechanism, wherein the CPU determines whether or not an output from the distance-measuring circuit is suitable for the focusing operation, and if the CPU determines that the output is not suitable for the focusing operation, the CPU adjusts the focus state of the photographing lens by a mount-climbing system using an image signal outputted by the electronic image pickup element instead of the output from the distance-measuring circuit.

DETAILED DESCRIPTION OF THE INVENTION

Embodiments of the present invention will be described below with reference to the drawings.

The present invention provides a camera provided with a distance-measuring device which operates at high speed on the basis of external light AF and which makes accurate measurements on the basis of mount climbing AF (imager AF). First, the concepts of the external light AF and mount climbing AF will be described with reference to the image signals in the distance-measuring composition and photographing screen shown in FIGS. 2A, 2B, and 3A to 3E.

In the description below, distance measuring based on an external light (passive) system will be referred to as external-light distance measuring. Distance measuring further including focusing will be referred to as external light AF. The external light AF focuses a photographing lens by identifying the position of a main subject on the basis of a phase difference between image signals (luminance) for distance-measuring areas set in a photographing screen, to measure the distance to the subject. Furthermore, distance measuring based on a mount-climbing system is referred to as mount-climbing distance measuring. The distance measuring further including focusing is called mount climbing AF. The mount climbing AF obtains a contrast signal from an image pickup element so as to scan a high contrast area (subject contrast: luminance ratio) in the photographing screen. This contrast signal is used to focus the lens on the main subject.

Figure 2A:
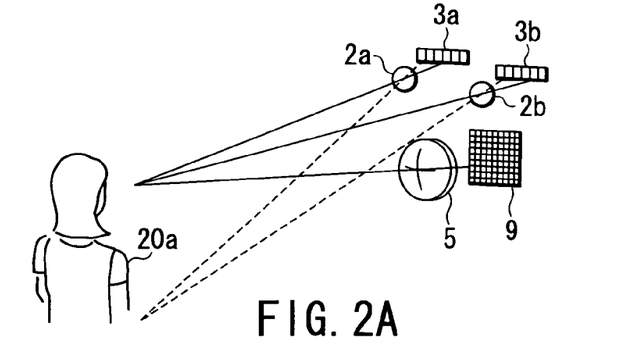
FIGS. 2A and 2B are views illustrating the concept of distance measuring.

With the camera according to the present invention, signal detection and image pickup for focusing are carried out using an image pickup element 9 that picks up an image of a subject formed by the photographing lens 5, for example, as shown in FIG. 2A. Moreover, the camera is further provided with a distance-measuring device composed of a pair of light receiving lenses 2a and 2b and a pair of line sensors 3a and 3b to measure the distance to a main subject 20a.

In this arrangement, a coverage (photographing screen) obtained by the image pickup element 9 in the form of an image formed by the photographing lens 5 does not always match a coverage (distance-measuring area) obtained by the line sensors in the form of an image formed by the light receiving lenses 2a and 2b.

Figure 3A:
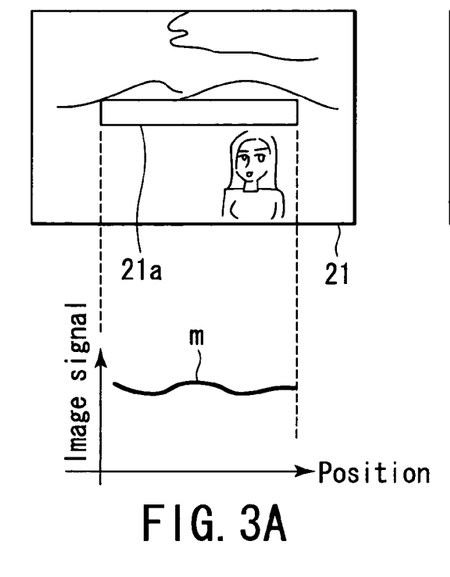
FIGS. 3A to 3E are views illustrating a composition and distance-measuring areas in a photographing screen.

In general, a photographing screen 21 formed on the image pickup element 9 as an image using the photographing lens 5 differs from a distance-measuring area 21a formed on the sensor arrays (distance-measuring sensors) 3a and 3b as an image using the light receiving lenses 2a and 2b, as shown in FIG. 3A. This is normally because the distance-measuring area of the sensor arrays has its vertical width reduced and is thus shaped like a horizontally elongate band. The horizontally elongate band shape is employed because the main subject 20a is likely to be present in the center of the photographing screen and because enlargement of the distance-measuring area, i.e. an increase in the size of the light receiving surface of the sensor arrays increases costs.

This band shape limits the distance-measuring area to the center of the photographing screen in the vertical direction of the photographing screen. To compensate for this, the sensor arrays are also arranged in the vertical direction. For example, it is contemplated that three sensor arrays are used so that a distance-measuring area 21a is set in the center, while distance-measuring areas 21b and 21c are set above and below the distance-measuring area 21a, respectively, as shown in FIG. 3D.

If the photographing lens 5 is a zooming lens, a zooming operation changes the photographing screen (the angle of view) to a telephoto side screen 21T or a wide angle side screen 21W. In general, the light receiving lenses of the distance-measuring device do not interlock with zooming driving of the photographing lens. Accordingly, the main subject may move to an end of the photographing screen depending on the angle of view and may thus stand in a non-distance-measuring area that cannot be covered by the distance-measuring area 21a, 21b, or 21c. For example, if the main subject 20a is present in a non-distance-measuring area as shown in FIG. 3D, the present embodiment, described later, effectively solves this problem.

Furthermore, an AF system employed in a single-lens reflex camera and referred to as a TTL positional difference auto focus (AF) shares the optical path of the photographing lens but similarly fails to cover the entire photographing screen (image pickup element) owing to restrictive conditions attributed to an AF optical path provided behind the optical path of the photographing lens. The present embodiment, described later, effectively solves this problem.

Figure 3B:
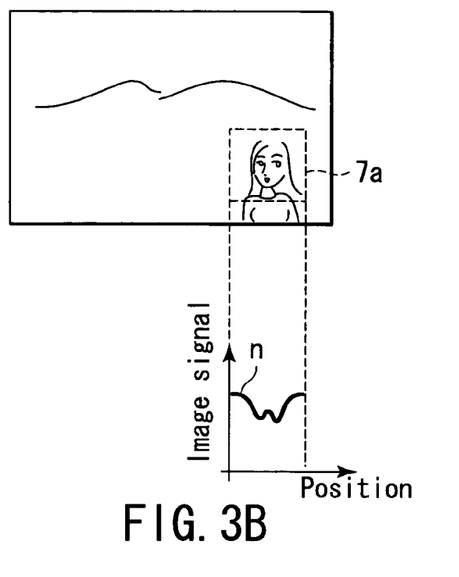
Figure 3C:
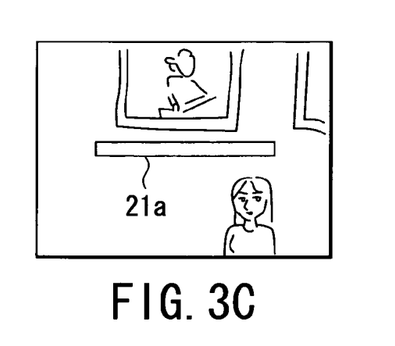
Figure 3D:
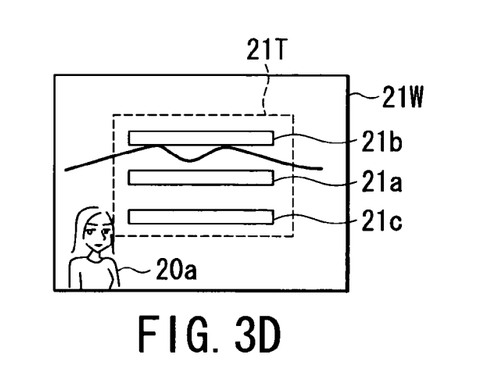

In a photographing scene such as the one shown in FIG. 3A or FIGS. 3C and 3D, the distribution of luminance is flat as shown, for example, by an image signal m for the distance-measuring area 21a obtained by the sensor arrays. It is thus impossible to obtain an image signal of a high contrast which is suitable for distance measuring. Consequently, for these photographing scenes, if the external-light distance measuring, which executes a distance-measuring process on the basis of the degree of the match between image signals (phase difference), distance measurement and focusing cannot be achieved accurately.

Thus, the mount-climbing distance measuring is used to search the photographing screen for a high contrast area 7a as shown in FIG. 3B. Then, auto focusing (AF) is carried out using a contrast signal n obtained.

The external-light distance measuring is an AF system utilizing the predetermined relationship between the distance to a subject (hereinafter referred to as a "subject distance") and the focus position of the photographing lens with respect to the subject distance. The mount-climbing distance measuring is a method of gradually shifting the focus position of the photographing lens to determine the focus position at which the best contrast signal is obtained. The mount-climbing distance measuring is a feedback control method of scanning the photographing lens so as to find a high contrast area. Accordingly, under ideal conditions, this method enables more accurate focusing than the external-light distance measuring while canceling a temperature characteristic and a difference in posture. However, it requires a long time to complete an AF operation.

Figure 3E:
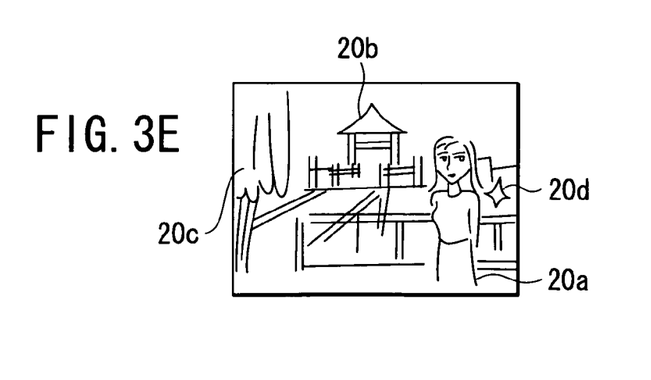

The present invention provides a camera based on a focusing method which avoids focusing requiring a long time to complete a distance-measuring operation and which can be executed quickly and easily owing to the effective use of the high speed of the external-light distance measuring. For example, as shown in FIG. 3E, in a photographing scene such as a sightseeing spot, a composition is such that in addition to the person 20a as a main subject, a building 20b, a tree 20c, and various other subjects are present in the background. For such a photographing scene, not only the person but also the description of the background are important. Accordingly, the focusing accuracy based on the external-light distance measuring alone is sufficient. The focus is preferably set at a focus position appropriately focused on these various subjects.

However, with a photographing scene such as the one shown in FIG. 3A, 3C, or 3D, if the person as a main subject is not accurately in focus, then the resulting photograph may be unsatisfactory because which subject is in focus is unknown. For the distance measuring for these photographing scenes, the person has a sufficient contrast compared to the background. Accordingly, the mount-climbing distance measuring is preferably used.

Now, the principle of the external-light distance measuring will be described in detail with reference to FIGS. 4A and 4B.

For the pair of light receiving lenses 2a and 2b, the distance between principal points is equal to a baseline length B. The light receiving lenses 2a and 2b thus guide an image (subject image) from the subject 20 to the corresponding distance-measuring sensors, i.e. the sensor arrays 3a and 3b. In this case, in accordance with triangulation, the subject image is formed on a light receiving surface of each of the sensor arrays 3a and 3b with a relative positional difference x from the optical axis of the corresponding light receiving lens which axis is set as an origin. The relative positional difference x can be used to determine the subject distance L.

Figure 4A:
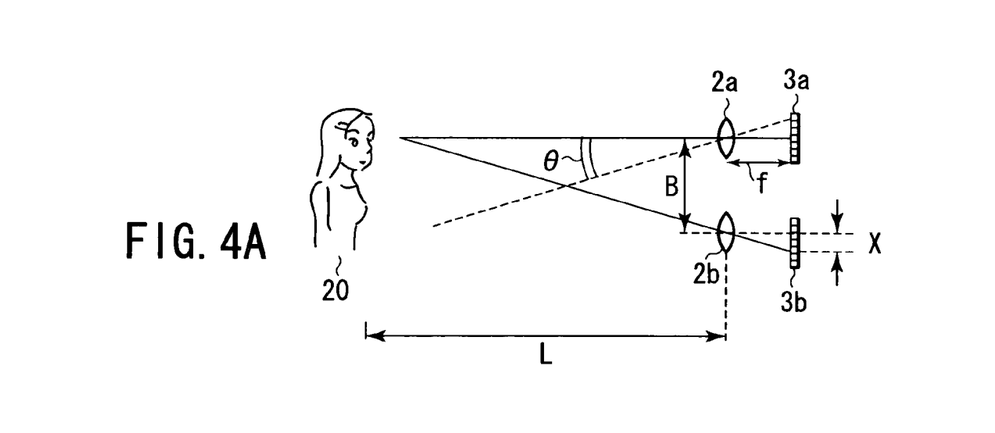
FIGS. 4A and 4B are views showing the positional relationship between light receiving lenses and sensor arrays with respect to a subject which relationship is required to determine the distance to a subject.

As shown in FIG. 4A, an image on the optical axis of the light receiving lens 2a is incident on the sensor array 3b at a position x through the optical axis of the light receiving lens 2b. In this case, this distance-measuring device can determine the subject distance for a subject image that is not incident through the optical axis of the light receiving lens 2a. For example, it is assumed that the subject distance for a position shifted from the optical axis of the light receiving lens 2a through an angle θ as shown in FIG. 4A is determined. When the focal distance of the light receiving lenses is defined as f, the relative positional difference x may be detected utilizing an image formed at a position ftan θ. Once the relative positional difference x is detected, the subject distance L can be determined on the basis of the principle equation of triangulation L=Bf/x.

With such AF based on the external-light distance measuring, the pair of light receiving lenses 2 and 2b and the pair of sensor arrays 3a and 3b are arranged like both eyes of a human being to detect the subject distance on the basis of the principle of triangulation. Then, the photographing lens is focused on the basis of the subject distance.

Figure 4B:
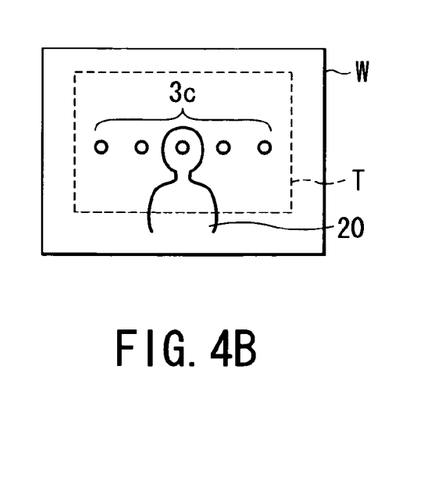

With such a distance-measuring device, a plurality of distance-measurings can be set in the direction in the screen in which the sensor arrays are arranged, as shown in FIG. 4B. Thus, distance data can be obtained at the plurality of points. Such a distance-measuring device as can execute a distance-measuring process on a plurality of points is referred to as a "multipoint distance-measuring device". With the external-light distance measuring, the sensor arrays monitor the same points on the screen whether the angle of view is changed to the telephoto side or the wide angle side by a zooming operation of the photographing lens.

Now, a first embodiment of the present invention will be described.

Figure 1:
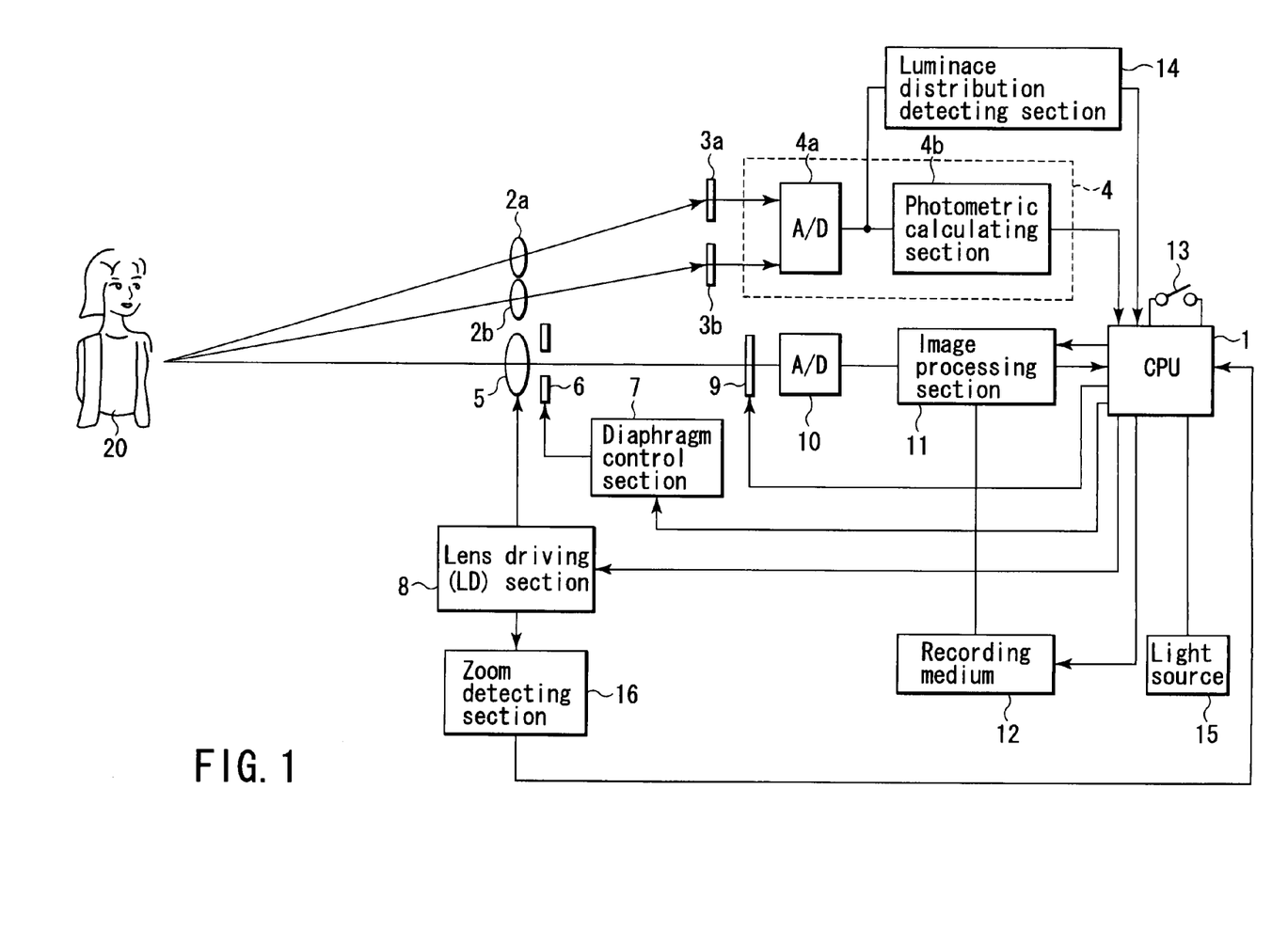
FIG. 1 is a block diagram showing the internal configuration of a camera according to a first embodiment of the present invention.

FIG. 1 is a block diagram showing the internal configuration of a camera according to the first embodiment.

The camera includes a microprocessor (CPU) 1, a pair of light receiving lenses 2a and 2b and a pair of sensor arrays 3a and 3b used for distance measuring, a distance-measuring section 4, a photographing lens 5, a diaphragm 6, a diaphragm control section 7, a lens driving (LD) section 8, an image pickup element 9, an analog/digital (A/D) converting section 10, an image processing section 11, a recording medium 12, a luminance distribution detecting section 14, and a light source 15.

The CPU 1 functions as calculation control means for controlling a sequence for the whole camera. The CPU 1 connects to a switch 13 used to start a photographing sequence. The CPU 1 determines that a photographer has turned on the switch 13 to clear a standby state and start the photographing sequence.

The pair of light receiving lenses 2a and 2b form the subject 20 into a subject image on the light receiving surfaces of the sensor arrays 3a and 3b, arranged behind the light receiving lenses 2a and 2b, respectively. Each of the sensor arrays 3a and 3b carries out a photoelectric conversion to convert the subject image into an electric signal (hereinafter referred to as an image signal) based on the subject image. Each of the sensor arrays 3a and 3b then outputs the electric signal to the distance-measuring section 4.

The distance-measuring section 4 is what is called "passive" distance-measuring means including an A/D converting section 4a and a distance-measuring section 4b. The A/D converting section 4a in the distance-measuring section 4 converts an image signal inputted by each of the sensor arrays 3a and 3b into a digital image signal. The A/D converting section 4a then outputs the digital image signals to the distance-measuring section 4b. On the basis of these digital image signals, the distance-measuring section 4b calculates the distance from the camera to the subject 20, i.e. the subject distance using the principle of triangular-measuring. The luminance distribution detecting section 14 detects the distribution of luminance on the basis of the result of the A/D conversion by the A/D converting section 4a.

The CPU 1 controls the focusing of the photographing lens 5 on the basis of the subject distance calculated as described previously. That is, the CPU 1 carries out focusing by controlling the LD section 8 on the basis of the subject distance calculated by the distance-measuring section 4b, to move the lens position of the photographing lens 5. After the focusing has been finished, the CPU 1 shifts to an exposure operation. In the exposure operation, the quantity of light incident on the image pickup element 9 is controlled by the diaphragm 9 and a shutter (not shown). In this case, the diaphragm 6 is controlled by the diaphragm control section 7, and the shutter is controlled by a shutter control section (not shown).

The image pickup element 9 is composed of a semiconductor image pickup element such as a CCD. The image pickup element 9 subjects a subject image obtained by the photographing lens 5 to a photoelectric conversion to generate an image signal. The image pickup element 9 then outputs the image signal to the A/D converting section 10.

The A/D converting section 10 converts the image signal into a digital signal and then outputs the digital signal to the image processing section 11. On the basis of the inputted digital signal, the image processing section 11 carries out, for example, corrections of the color or gradation of the image and then compresses the image signal. Furthermore, a sensitizing process is executed by the CPU 1 by restricting the amount of images accumulated in the image pickup element 9 and allowing the image processing section 11 to amplify and emphasize a restricted output from the image pickup element 9. The image processing section 11 executes the above process and then records the processed signal in the recording medium 12 as image data. Then, the exposure operation is completed.

The light source 15 projects supplementary light for exposure or distance measuring or the like on the subject 20 in accordance with the photographing scene. If a zooming optical system is mounted in the camera as a photographing lens, the camera is provided with a zoom position detecting section 16 that detects the position of a zoom lens, in addition to the previously described arrangements.

The positional relationship between the light receiving lenses 2a and 2b and sensor arrays 3a and 3b and the photographing lens 5 and the image pickup element 9, all of which have previously been described, is as shown in FIG. 2A. Thus, the same subject image can be detected using the sensor arrays 3a and 3b and the image pickup element 9. Alternatively, when outputs from the sensor arrays 3a and 3b are used to calculate the subject distance, the distances to subjects in the photographing screen other than the subject 20 can be detected using, instead of an image of the subject 20 formed at a position shown by the solid line in the figure, an image of the subject formed at a different position, e.g. a position shown by the broken line in the figure, as shown in FIG. 4B.

Figure 2B:
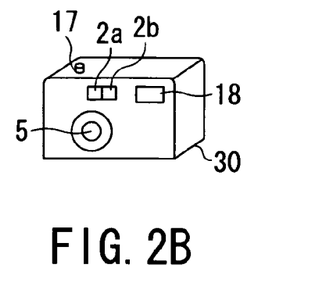

FIG. 2B shows the appearance of the camera according to the first embodiment.

A camera 30 is provided with a release button 17 on its top surface which is used to operate the previously described switch 13. The camera 30 is also provided with a light exit window 18 for a light source 15 on its front surface and the previously described photographing lens 5 and light receiving lenses 2a and 2b also on its front surface so as to have the positional relationship shown in FIG. 2A. In this connection, AF utilizing the output from the image pickup element 9 via the photographing lens 5 is referred to as "imager AF".

The imager AF first detects the contrast of the image of the subject formed on the image pickup element 9 while allowing the LD section 8 to move the photographing lens 5. Then, a position of the photographing lens 5 exhibiting the highest contrast is determined to be a focus position. Specifically, the imager AF is focusing control based on a principle different from the one which determines the focus position on the basis of the subject distance as in the case of the previously described external light AF. With such image AF, even if an error occurs in the positional control of the photographing lens, the focus position can be detected with the error taken into account.

However, if the person 20a as a main subject is present in an area different from a central portion (distance-measuring area) of the photographing screen 21 as shown in FIG. 3E, it is difficult to quickly focus the photographing lens 5 on the person 20a. Specifically, to identify the main subject, it is necessary to determine the contrast of each of the person 20a and other subjects such as the building 30b and the tree 20c which are present in the background as described previously and then determine which subject can be optimally used as a main subject, e.g. which subject is closest to the camera. In this case, the contrast must be determined after temporarily loading images obtained at focus positions corresponding to the respective subjects. It thus takes a long time to determine the main subject.

Furthermore, when supplementary light for distance measuring is required because of the low luminance of the subject, the light is emitted every time the contrast is determined as described previously. Thus, when photographing is started, the light source 11 may not have sufficient remaining energy for stroboscopic irradiation.

In contrast, the external light AF determines the subject distance by detecting image signals from the sensor arrays 3a and 3b, shown in FIG. 2A, to detect a difference between image signals for the subject based on the parallax of the light receiving lenses 2a and 2b.

That is, the photographing lens 5 is driven only after the focus position has been determined. Accordingly, focusing requires a shorter time than that based on the imager AF. Furthermore, the distances to subjects other than the main subject can be determined simply by switching the image signal for the subject used to calculate the subject distance. Consequently, the distribution of the distances to subjects present in a wide area can be detected without being limited by the position of the main subject.

Figure 5:
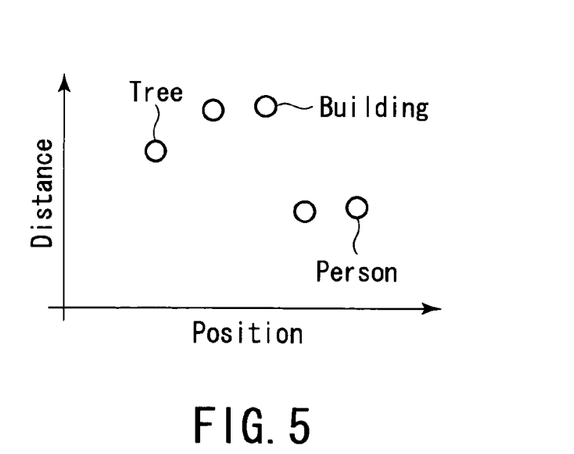
FIG. 5 is a graph showing an example of the distribution of distances to subjects in a composition to be photographed.

FIG. 5 shows an example of the distribution of the distances determined as described previously. The determination of the distance distribution enables a quick detection as to where the main subject is present on the photographing screen.

Figure 6:
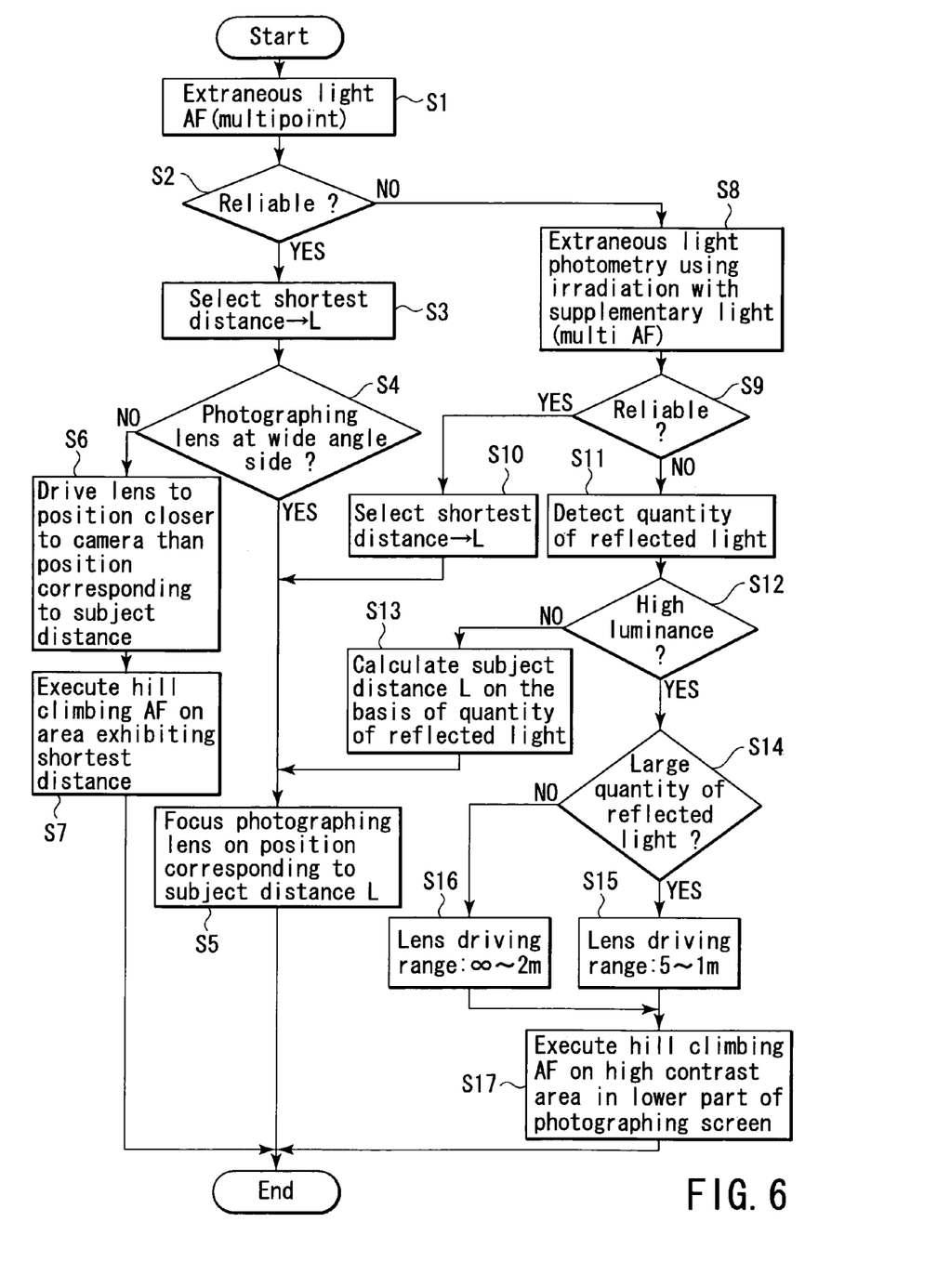
FIG. 6 is a flow chart illustrating photographing control for a camera according to a first embodiment.

Now, with reference to the flow chart shown in FIG. 6, description will be given of photographing control of the camera according to the present embodiment.

First, a multipoint distance-measuring operation is performed using an external-light distance-measuring device (step S1). It is determined whether the obtained results of the external-light distance measuring are reliable (step S2). When a photographing scene such as the one shown in FIG. 3A is subjected to external-light distance measuring, the distance-measuring results obtained constitute a flat image signal. It is thus determined that the image cannot be detected and the main subject cannot be identified, i.e. the distance-measuring, results are not reliable (NO). The process thus shifts to step S8, described later. On the other hand, if a photographing scene such as the one shown in FIG. 3E is subjected to external-light distance measuring, the contrast of the person 20a is so clear that it can be detected that the person 20a is present in front of the building 20b and the tree 20c. It is thus determined that the results are reliable (YES). Then, one of the subjects on the photographing screen which is closest to the camera is considered to be a main subject to determine the focusing distance L (step S3).

Then, if the photographing lens of the camera is a zoom lens, the zoom detecting section 16 detects the position of the photographing lens (what is called a zoom position) to determine whether or not the zoom position is at a wide angle side (step S4). If it is determined that the zoom position is at the wide angle side (YES), the focal depth is considered to be large. Then, the lens is focused on the basis of the results of the external-light distance measuring described previously (step S5). However, if the focal distance (zoom position) of the photographing lens is at the telephoto side (NO), the LD section 8 drives the lens to a lens position in front of the position corresponding to the determined distance L (step S6). Then, of the results obtained by the multipoint distance measuring in step S1, an image signal for the point exhibiting the shortest distance is detected using the image pickup element. Subsequently, the lens is focused using mount-climbing distance measuring (step S7). This is because if the zoom position is at the telephoto side, accurate focusing is preferred since the depth of the subject is so small that the focus may be between the background and the person even in a photographing scene such as the one shown in FIG. 3E. Such accurate focusing is used in order to prevent the following situation. If the zoom position is at the wide angle side, when the focus is between the background and the person, both background and person are in focus. However, if the zoom position is at the telephoto side, not both of them may be in focus.

If it is determined at step S2 that the results are not reliable (NO), external-light distance measuring is performed by using stroboscopic light, originally used for exposure, is used as supplementary light for distance measuring (step S8). This is effective if the subject is dark (the person has a low subject luminance) even in a photographing scene such as the one shown in FIG. 3E. In such a case, there are no variations in luminance over the entire photographing screen, resulting in a flat image signal, i.e. a low contrast. Then, it is determined whether distance-measuring results are reliable which are obtained by the external-light distance measuring using irradiation with supplementary light (step S9). If it is determined that the results are reliable (YES), the shortest distance L obtained at step S8 is selected (step S10). The process then shifts to the above-described step S5 to focus the lens on the position corresponding to the distance L. The lens is focused on the position corresponding to the distance L obtained without depending on the zoom position of the photographing lens because it is difficult to achieve mount-climbing distance measuring using stroboscopic supplementary light.

Furthermore, even if the contrast of the image is not obtained, the lens can be focused by detecting the quantity of reflected light. Thus, the quantity of light reflected by the subject is detected (step S11). It is then determined whether or not the luminance is higher than a preset threshold (determination criterion) (step S12). This determination criterion is empirically set depending on whether or not an appropriate distance-measuring operation can be achieved. The determination based on the quantity of reflected light utilizes the fact that a smaller quantity of light returns from a subject present at a longer distance, whereas a larger quantity of light returns from a subject present at a shorter distance. If the luminance is determined not to be high (NO), the subject distance L is calculated on the basis of the quantity of reflected light (step S13). The process then shifts to the above-described step S5 to focus the lens on the position corresponding to the distance L. However, this is effective when the subject is dark (low luminance) as described previously. If the subject is determined to be bright (high luminance), it is then determined on the basis of the quantity of reflected light that the quantity of stationary light or background light is large and that the above operation is not effective. The process thus shifts to the sequence of high-climbing distance measuring.

If at the above-described step S12, the luminance is determined to be high (YES), it is then determined whether or not the quantity of reflected light is larger than a predetermined value (step S14). The quantity of reflected light allows the determination of whether the photographing scene is as shown in FIG. 3A or 3C. That is, a photographing scene such as the one shown in FIG. 3A provides a smaller quantity of reflected light. A photographing scene such as the one shown in FIG. 3C provides a larger quantity of reflected light.

With the mount-climbing distance measuring, the time required for the distance measuring can be more sharply reduced when the magnitude of driving of the lens is smaller during the determination of the contrast. Thus, if the quantity of reflected light is large (YES), the driving range of the photographing lens is limited to 5 to 1 m (step S15). In contrast, if the quantity of reflected light is small (NO), the driving range of the photographing lens is limited to infinity to 2 m (step S16). Within these driving ranges, mount climbing AF is concentrated on a light contrast area in the lower part of the photographing screen (composition) (step S17).

If there are more contrast detected areas than required, the amount of data increases, thus requiring a longer time for processing. Accordingly, the areas already monitored by the sensors during the external-light distance measuring are not subjected to detection because they are already known to lack contrast at this point.

Furthermore, as shown in FIGS. 3A and 3C, the main subject is normally likely to be present in the lower part of the composition. Accordingly, the detection is designed to concentrate on the lower part of the composition. If the device is provided with an image processing circuit that can detect, during focusing, an area 7a in the output from the image pickup element which area exhibits the highest contrast as shown in FIG. 3B, then the area 7a may be found and given top priority in contrast determination for a mount-climbing distance measuring.

As described above, according to the present embodiment, a camera can be provided which is capable of quick focusing by effectively utilizing the distance-measuring results of the external light AF as well as reflected light signals.

Figure 7:
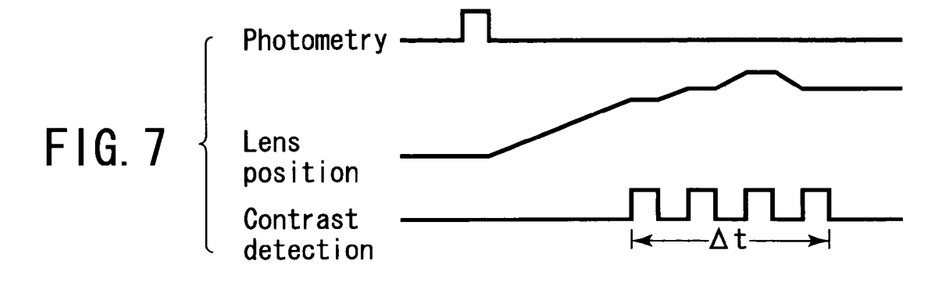
FIG. 7 is a timing chart illustrating a focusing time for photographing according to the first embodiment.

Now, with reference to FIG. 7 that is a timing chart for photographing according to the present embodiment, the focusing time will be described.

If the previously described external-light distance measuring is used to carry out focusing, the lens can be focused by a distance-measuring operation and a single lens driving operation, immediately followed by photographing. This eliminates the need for the time required for contrast detection and associated movement of the lens position, as required for the conventional imager AF. That is, the external-light distance measuring reduces the release time lag At shown in FIG. 7, compared to the image AF, which requires a distance-measuring operation and a plurality of lens driving operations. Consequently, for a common snap scene having a bright background and bright subjects as shown in FIG. 3E, the external light AF can be used to quickly focus the lens.

In contrast, for a photographing scene for which an image signal detected in the distance-measuring area for the external-light distance measuring lacks contrast as shown in FIG. 3A, the lens can be focused so as to detect the main subject by detecting the contrast of an image signal detected at an arbitrary point in a solid image pickup element such as a CCD using the imager AF.

As described above, according to the first embodiment, a camera can be provided which is capable of photographing that satisfies the photographer in accordance with the photographing scene.

Now, a second embodiment will be described.

Figure 8:
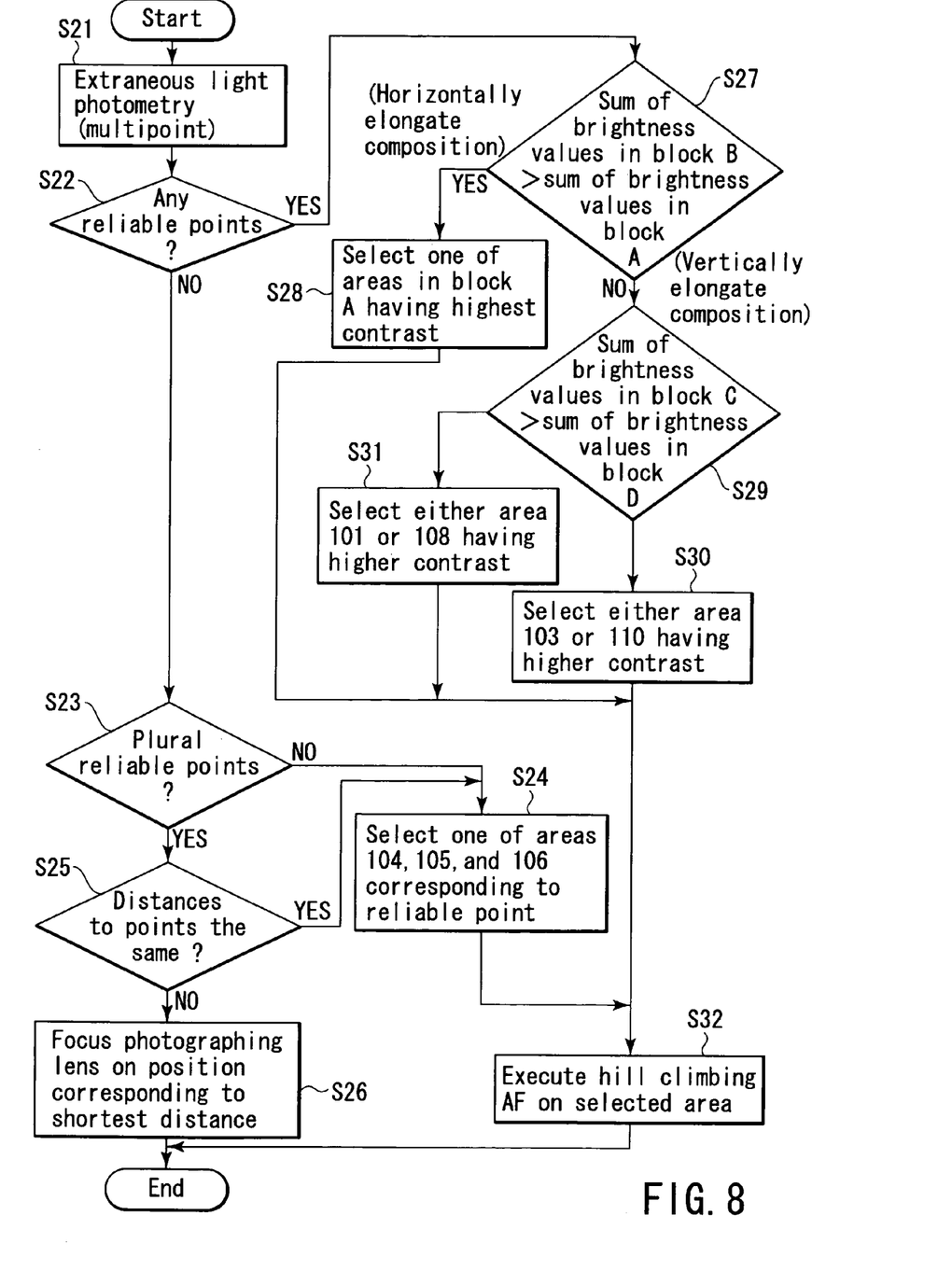
FIG. 8 is a flow chart illustrating photographing control for a camera according to a second embodiment.
Figure 9:
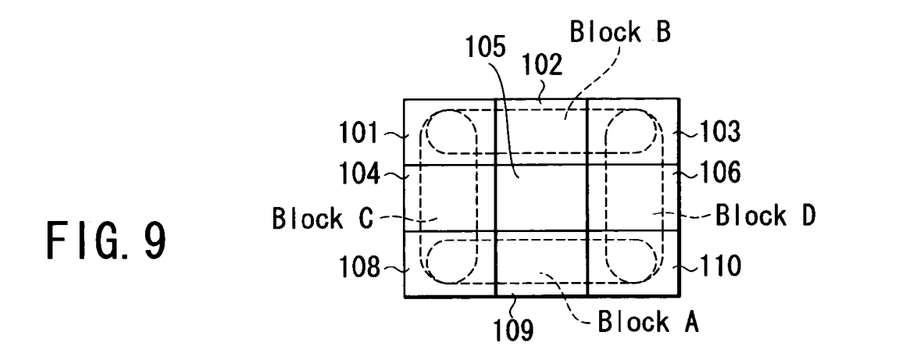
FIG. 9 is a view showing an example of a divided photographing screen for imager AF.
Figure 10A:
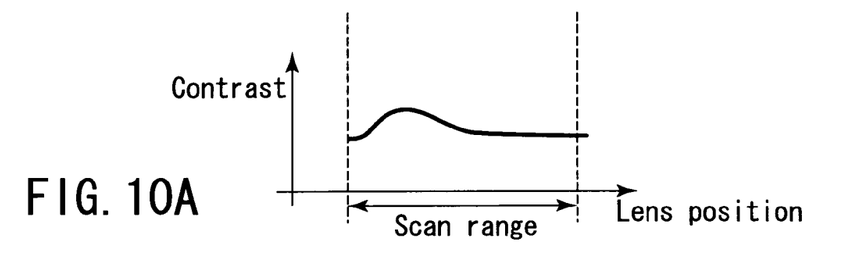
FIGS. 10A and 10B are graphs showing the relationship between a scan range and a contrast characteristic for an image pickup element which relationship is observed in contrast determinations.
Figure 10B:
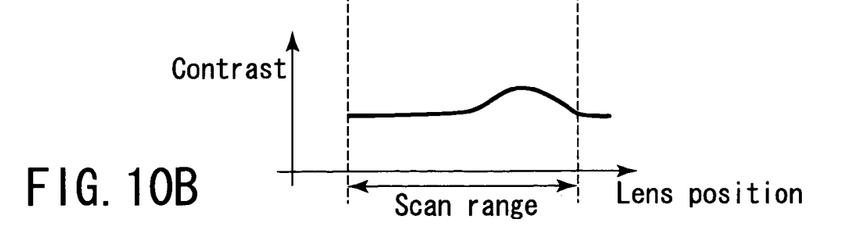

With reference to the flow chart shown in FIG. 8, description will be given of distance measuring in a camera according to the second embodiment. FIG. 9 is a view showing nine distance-measuring areas 101 to 110 into which the photographing screen for the imager AF (mount climbing AF) is divided as well as the distance-measuring area 21a for the external-light distance measuring.

First, a multipoint distance-measuring operation is performed on the basis of the external-light distance measuring (step S21). It is determined whether the distance-measuring results obtained are reliable (step S22). If it is determined for the distance-measuring results for all the points that any point is reliable in light of a determination criteria, e.g. the sensor data obtained contains a difference in luminance or two sensor data are well matched (YES), then it is determined whether or not a plurality of points are reliable (step S23). If it is determined that only one point is reliable (NO), one of the distance-measuring areas (104, 105, and 106, shown in FIG. 9) corresponding to this point is selected (step S24). The process then shifts to step S, described later, to carry out the mount climbing AF, which has no errors in the feeding of the photographing lens. Specifically, if only one point is reliable, the contrast is considered to be low at the other points. Thus, the focusing of the lens must be concentrated on this point.

However, if a plurality of points are determined to be reliable at the above-described step S23 (YES), then it is determined whether or not the distances to these points are the same (step S25). If the distances are the same (YES), the process shifts to the previously described step S25 to select an area. On the other hand, if the distances are different (NO), the lens is focused on one of the points which is closest to the camera (step S26). Thus, the distance-measuring sequence is finished. In this case, errors in the feeding of the photographing lens may be superimposed on one another. Accordingly, when the lens is focused on the point corresponding to the shortest distance, the focus position is slightly shifted toward the longer distance side in view of subjects present at longer distances.

On the other hand, if it is determined at the above-described step S22 that no points are reliable (YES), a distance-measuring area is selected and then the mount climbing AF is carried out. This is because the external light AF does not enable either distance detection or focusing. When the mount climbing AF is carried out, if the contrasts of more areas than required are determined, an enormous amount of data must be determined. Consequently, the distance-measuring operation requires a long time. Moreover, the photographing lens is used to perform more scanning operations than required. This similarly requires a long time. Thus, in the present embodiment, the required distance-measuring area is selected.

First, one distance-measuring area is selected. The distance-measuring area used for the mount climbing AF is selected from the distance-measuring areas 101 to 110, into which the screen is divided as shown in FIG. 9.

The distance-measuring areas 104, 105, and 106, set in the center of the photographing screen in the vertical direction, overlap the detection area 21a for the external light AF. Accordingly, at step S21, the contrast has already been determined. Consequently, when the external light AF is disabled, it is determined that image signals for these distance-measuring areas do not have any differences in contrast and are thus ineffective. Determinations are thus made on the distance-measuring areas set in the vertical direction of the photographing screen.

Specifically, when the photographer holds the camera as usual, the screen is horizontally elongate as shown in FIGS. 3A to 3E. A block A including the distance-measuring areas 108 to 110 is located in the lower part of the screen. A block B including the distance-measuring areas 101 to 103 is located in the upper part of the screen. To make determinations on these areas, it is assumed that a bright sky is normally present in the upper part of the screen. Thus, the blocks are compared with each other by considering a brighter area to be the upper part of the screen.

In this comparison, first, to check whether or not the composition is horizontally elongate, the sum of brightness values in the block B (the sum of the brightness values of the distance-measuring areas within the block) is compared with the sum of brightness values in the block A (step S27). In this comparison, if the block B is brighter, the composition is determined to be horizontally elongate (YES). One of the distance-measuring areas 108 to 110 is selected which has the highest contrast (step S28).

On the other hand, if at the above-described step S27, the block A is brighter (NO), the photographing screen is determined to have a vertically elongate composition. Then, it is determined which lateral side of the screen 21 in FIG. 9 corresponds to the lower part of the screen as described previously. That is, the brightness of the left block C is compared with that of the block D (step S29). If the block C is determined to be brighter than the block D (YES), then in this vertically elongate screen, the block D corresponds to the lower part. If the block D is determined to be brighter than the block C (NO), then in this vertically elongate screen, the block C corresponds to the lower part. In the block determined to correspond to the lower part of the screen, the distance-measuring areas 104 and 106, which overlap the distance-measuring area 21a, are excluded from the distance-measuring targets because they have already been monitored. This enables the lens to be quickly focused without the need for duplicate wasteful control.

Then, either the distance-measuring area 103 or the distance-measuring area 110 is selected to exhibit the higher contrast (step S30). Likewise, either the distance-measuring area 101 or the distance-measuring area 108 is selected to exhibit the higher contrast (step S31). Then, the mount climbing AF is executed on each of the selected distance-measuring areas (step S32).

As described above, according to the present embodiment, the lens can be focused more quickly and accurately taking the length and breadth of the screen into consideration. In this manner, for the mount climbing AF, one of the distance-measuring areas is selected. This eliminates the need to determine the contrasts of a plurality of areas. Thus, the scan range of the photographing lens decreases sharply to allow the prompt execution of data processing for determinations. It is therefore possible to efficiently detect the main subject, while quickly focusing the lens.

As described above in detail, according to the present invention, a camera can be provided which has an AF function of quickly focusing a photographing lens without depending on the position of a main subject in a screen.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A camera acquiring an image of a subject using an electronic image pickup element, the camera comprising:
a photographing lens which guides a luminous flux from the subject to the electronic image pickup element;
a driving mechanism which drives a focusing lens included in the photographing lens;
focus detecting circuit based on a phase difference detecting system to detect a focus state of the focusing lens for a particular area including a central part of a photographing composition;
a light source which radiates the subject with an illumination light; and
a CPU that calculates a focus position of the focusing lens on the basis of a detection result from the focus detecting circuit to drivingly control the driving mechanism, wherein if the CPU determines that the output from the focus detecting circuit is not suitable for the focusing operation although the light source radiates the subject with the illumination light, and that a quantity of a part of the illumination light reflected by the subject is greater than a predetermined value, the CPU adjusts the focus state of the photographing lens by a mount-climbing system using an image signal, in a lower part of the photographing composition excluding the area for which the focus state is detected by the focus detecting circuit, of all image signals outputted by the electronic image pickup element.

2. A camera acquiring an image of a subject using an electronic image pickup element, the camera comprising:
a photographing lens which guides a luminous flux from the subject to the electronic image pickup element;
a phase difference auto focusing portion based on a phase difference detecting system, which detects a focus state of the photographing lens and drives the photographing lens to a focusing position based on a result of the detection, the phase difference auto focusing portion detecting the focus state of the photographing lens for a particular area including a central part of a photographing composition;
a mount-climbing auto focusing portion, which adjusts the focus state of the photographing lens based on a mount-climbing system using an image signal outputted by the electronic image pickup element, the mount-climbing auto focusing portion using the image signal for an area excluding the area for which the focus state is detected by the phase difference auto focusing portion;
an illuminating portion including a light source which radiates the subject with an illumination light and detecting a quantity of a part of the illumination light reflected by the subject;
a determining portion which determines whether focusing by the phase difference auto focusing portion is available or not; and
a controlling portion, which selects either focusing by the phase difference auto focusing portion or focusing by the mount-climbing auto focusing portion based on a result of the determination by the determining portion and the detected quantity of light.

3. The camera according to claim 2, wherein the controlling portion controls the focusing by the mount-climbing auto focusing portion, if the determining portion determines that the focusing by the phase difference auto focusing portion is not available and the quantity of light detected by the illuminating portion is greater than a predetermined value.

4. The camera according to claim 2, wherein the mount-climbing auto focusing, portion uses an image signal in a lower part of the photographing composition excluding the area for which the focus state is detected by the phase difference auto focusing portion.

5. The camera according to claim 2, wherein the mount-climbing auto focusing portion sets as a focusing area a portion where the contrast is increased when it is radiated with the illumination light.

6. A method for controlling a camera which acquires an image of a subject using an electronic image pickup element, the method comprising:

detecting a focus state of a focusing lens for a particular area including a central part of a photographing composition based on a phase difference detecting system, while radiating the object with an illumination light;

determining whether or not a result of the detection is suitable for auto focusing based on the phase difference detecting system;

determining whether a quantity of a part of light the illumination light reflected by the subject is greater than a predetermined value, if it is determined that the result of the detection is not suitable for auto focusing based on the phase difference detecting system; and adjusting a focus state of a photographing lens based on a mount-climbing system using an image signal, in a lower part of the photographing composition excluding the area for which the phase difference is detected, if the quantity of light is greater than the predetermined value.

* * * * *